United States Patent [19]
Blatt et al.

[11] Patent Number: 4,515,239
[45] Date of Patent: May 7, 1985

[54] NOISE REDUCTION LINING

[75] Inventors: Georg Blatt, Ingolstadt; Johannes van den Boom, Kösching; Geert Kuipers; Heinz Hollerweger, both of Ingolstadt, all of Fed. Rep. of Germany

[73] Assignee: Audi NSU Auto Union A.G., Ingolstadt, Fed. Rep. of Germany

[21] Appl. No.: 531,946

[22] Filed: Sep. 14, 1983

[30] Foreign Application Priority Data

Sep. 25, 1982 [DE] Fed. Rep. of Germany ....... 3235539

[51] Int. Cl.³ ............................................... E04B 1/82
[52] U.S. Cl. ..................................... 181/290; 181/286; 181/288

[58] Field of Search ................................ 181/284–286, 181/288, 290, 291, 295

[56] References Cited

U.S. PATENT DOCUMENTS 2,285,423 6/1942 Esser ..................................... 181/290
3,058,704 10/1962 Bergstedt ......................... 181/291 X Primary Examiner—Benjamin R. Fuller

[57] ABSTRACT

The invention relates to a noise reduction lining of the kind for use in passenger compartments of automobiles for absorbing engine noise of five or six cylinder combustion engines, and comprises between a cover layer and a base layer an absorption layer of open-pored elastic material into which is embedded a perforsted extinction layer.

6 Claims, 8 Drawing Figures

NOISE REDUCTION LINING

BACKGROUND OF THE INVENTION

This invention relates to means for reducing or dampening noise. In particular it relates to linings of the kind comprising an absorption layer which may be applied to a noise resonating surface.

Such linings are, for instance, in conventional use in the automotive industry where they are used to reduce the level of engine generated noise audible within the passenger compartment of automobiles. Thus, it is conventional to line noise resonating or reflecting surfaces, such as the interior surfaces of the sheet metal shell constituting the passenger compartment, with a layer of an elastic, preferably open-pored material capable of absorbing noise, and to seal or cover this layer by a cover layer, such as, for instance, carpeting.

Such linings are, particularly for certain frequency ranges, by and large performing satisfactorily. Tests have shown, however, that their effectiveness in absorbing or dampening noise commences at about 500 Hz and increases steadily with increasing frequencies. However, the noise spectrum of five or six cylinder internal combustion engines is such that within a range of from about 250 to about 650 Hz a particularly intense increase in wind noise as well as engine noise is discernible, i.e. in the very range in which conventional linings do not absorb or dampen noise generated by such engines in an optimal manner.

It is accordingly an object of the invention to provide a noise reduction lining having improved noise absorption or dampening properties.

A further object of the invention resides in the provision of a noise reduction lining effective for noise absorption in a relatively broad frequency range.

Still another object of the invention is to provide a noise reduction lining for use in automobiles powered by five or six cylinder internal combustion engines.

Another object of the invention is to provide a noise reducing lining being particularly effective in frequency ranges below 1 kHz.

A more particular object of the invention is to provide a noise reduction lining to absorb or dampen noise in the range characteristically generated by five or six cylinder engines.

Yet another object is to provide a noise reduction lining the increased cost of which is outweighed by the beneficial effect yielded by it.

Other objects will in part be obvious and will in part appear hereinafter.

SUMMARY OF THE INVENTION

In accordance with the invention these objects are accomplished by a noise reduction lining comprising an extinction layer positioned between a cover layer and a base layer and interposed between layers of absorbing material of different stiffness. Tests have shown that the lining in accordance with the invention yields a particularly good noise reduction in a range of frequencies between about 200 Hz and about 1 kHz.

In a preferred embodiment of the invention the extinction layer extends in parallel to the cover layer and is provided with openings or preforations.

In another embodiment of the invention the layers of absorption material on the surfaces of the extinction layer may be of different thickness.

In yet another embodiment of the invention the layer of absorption material between the cover layer and the extinction layer is open-pored and of a relatively stiff elasticity, and the absorption material between the extinction layer and the base layer is open-pored and of a relatively soft elasticity.

In another prefered embodiment the cover layer of the lining comprises the support layer of a carpet.

In a further embodiment the absorption material between the cover layer and the extinction layer may be provided with voids or cavities adjacent the openings or perforations of the extinction layer.

The invention accordingly comprises the several means and arrangements as explained in the following detailed disclosure, the scope of the invention being indicated by the claims.

BRIEF DESCRIPTION OF THE DRAWINGS

For a fuller understanding of the nature and objects of the invention reference should be made to the following detailed description and the accompanying drawings, in which.

DESCRIPTION OF AN ILLUSTRATIVE EMBODIMENT

Figure 1:
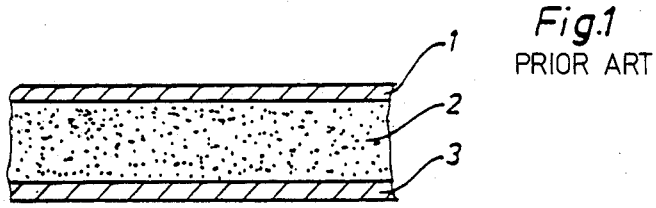
FIG. 1 is a cross-sectional view of a conventional noise reduction lining.

FIG. 1 depicts a conventional noise reduction lining of the kind used in passenger compartments of automobiles to reduce the level of audible engine noise. It comprises a cover layer 1, an absorption layer 2, and a base layer 3. The cover layer 1 may be the base layer or backing of a carpet. The absorption layer 2 is preferably an open-pored material of a kind well-known in the art, and the base layer 3 usually comprises sheet metal such as the shell of the passenger compartment. But for the absorption layer 2 applied to it the base layer 3 would resonate with and reflect noise generated by the engine of the automobile.

Figure 2:
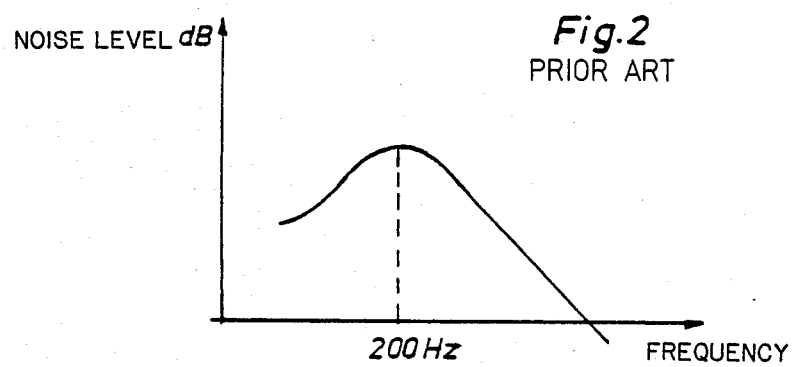
FIG. 2 is a diagrammatic presentation of the noise reduction achieved by the lining of FIG. 1 as a function of frequency.

Noise absorbed by the lining of FIG. 1 is depicted as a function of frequency in FIG. 2. The X-axis indicates frequency; the Y-axis depicts noise reduction or absorption. As may be seen from the drawing, at low frequencies the level of noise reflected initially increases as the frequency increases and, beginning at a range of about 200 Hz, it decreases, the decrease amounting to about 12 dB/octave. As may also be seen from the drawing, the range of frequencies in which noise is best absorbed commences at approximately 500 Hz. Further increases in frequency lead to increased noise absorption. Tests have shown that the lining yields excellent noise absorption commencing at about 3 kHz. From a technical point of view noise absorption in this range, however, is not required.

Figure 3:
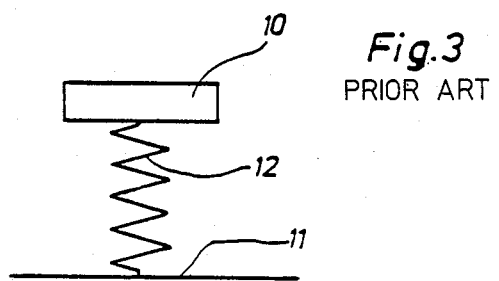
FIG. 3 is a diagram of a functional model explaining how noise is reduced by the lining of FIG. 1.

The action of the lining may be explained by means of the function model depicted in FIG. 3. The base or noise reflection layer 3 of FIG. 1 is represented by an anchoring point 11 of a spring 12. The spring 12 is loaded by a free-floating mass 10 and is energized by way of the anchoring point 11. The mass 10 may be likened to the cover layer 1. The spring 12 represents the absorption layer 2. As will be appreciated by those skilled in the art, the stiffness of the spring 12 is comparable to the sum of the compressibility of the air in the absorption layer 2 and of the inherent or skeleton stiffness thereof. Thus it will be apparent that the positive effect of the absorption layer 2 results from the fact that the adiabatic compression accompanying the rapid action of acoustic wave oscillations is converted into isothermic compression.

Figure 4:
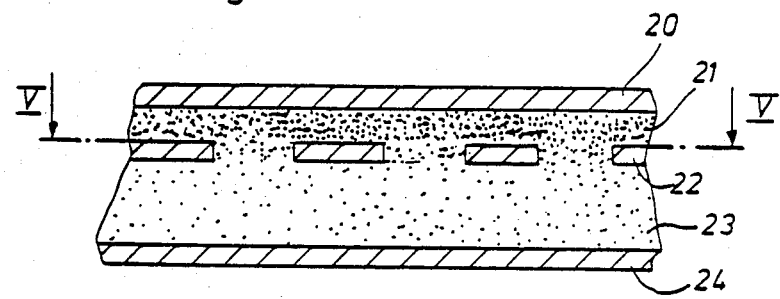
FIG. 4 is a cross-sectional view of a noise reduction lining in accordance with the invention.
Figure 5:
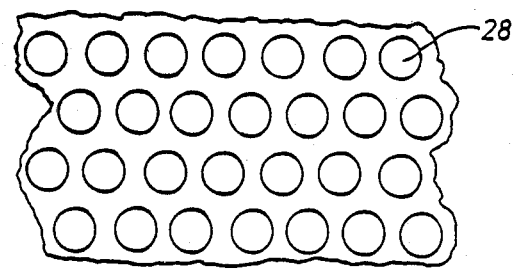
FIG. 5 is an elevational view, on an enlarged scale, of an extinction layer along the section line V—V in FIGS. 4 and 8.

With a view of influencing the noise absorption action of the lining in the desired manner, a lining as depicted in FIG. 4 was constructed. In accordance with the invention, an absorption layer 23 is applied to a base layer 24. The base layer 24 is similar to the base layer 3 of the lining of FIG. 1 and comprises a sheet metal, such as, for example, the shell of a passenger compartment of an automobile. The absorption layer 23 is covered by an extinction layer 22. The extinction layer 22, in turn, is covered by a further absorption layer 21, and the absorption layer 21 is provided with a cover layer 20. The cover layer 20 may be similar to the one shown in FIG. 1. The absorption layer 23 may be likened to the absorption layer 2 of FIG. 1, but the cover layer 1 of FIG. 1 is in this case divided into the cover layer 20, the absorption layer 21, and the extinction layer 22. By comparison with the absorption layer 23 the absorption layer 21 is relatively stiff. In both instances, however, they comprise an open-pored material of a kind well-known in the art. The extinction layer 22, as may be seen from FIG. 5, is provided with openings or perforations 28. The perforations 28 permit an unimpeded transfer of air between the two absorption layers 21 and 23, it being the intent that a certain interaction take place between the two layers.

The function of this system may be explained with reference to FIG. 6. An anchoring point 34 of a spring 33 functions as the base layer 24. As in the case of the spring 12 of FIG. 3, the spring 33 is energized by its anchoring point. The connection between the anchoring point 34 and a system comprising two elastically (by a spring 31) coupled masses 30 and 32 is accomplished by the spring 33. As will be appreciated by skilled artisans, the system 30, 31, and 32 represents a model of the layers 20, 21, and 22. Hence, the cover layer 20 is represented by the mass 30, the extinction layer 22 is represented by the mass 32, and the relatively elastic absorption layer 21 is represented by the spring 31.

Figure 6:
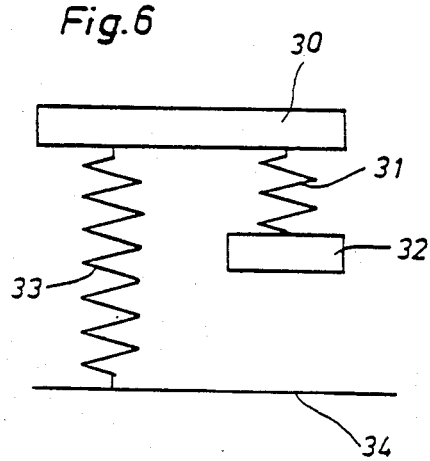
FIG. 6 is a diagram of a functional model explaining how noise is reduced by the lining of FIG. 4.

Those skilled in the art will appreciate that the model of FIG. 6 is but an approximation of the lining depicted in FIG. 4, and of its function. Thus it is pointed out that the function of the model does not in all respects parallel the function of the latter. The force of the spring 33 is an approximation of the sum of the compressibility of the air between the cover layer 20 and the base layer 24 and of the inherent or skeleton stiffness of the absorption layers 21 and 23. The force of the spring 31 approximates the skeleton stiffness of the absorption layer 21 together with the compressibility of the air in this layer.

Figure 7:
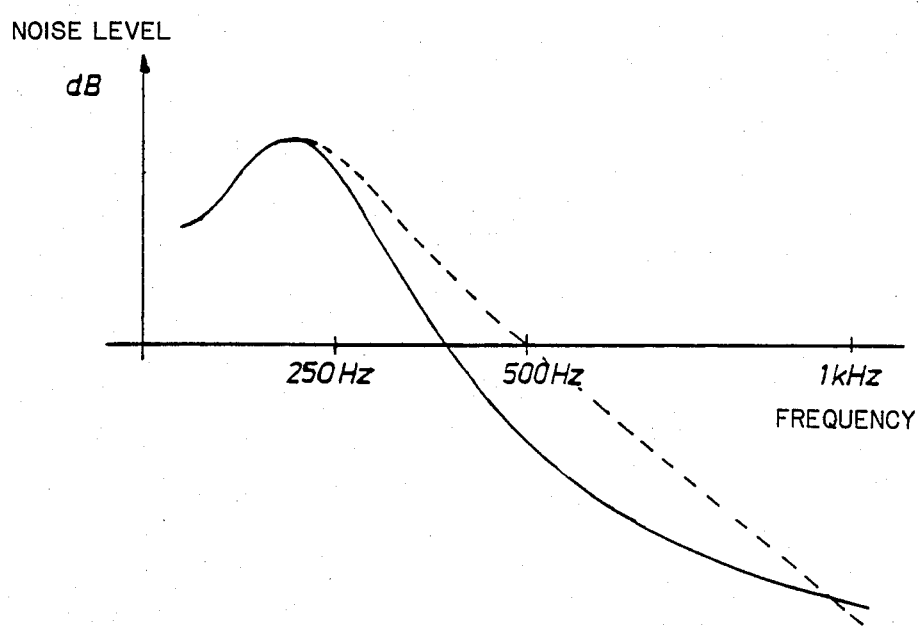
FIG. 7 is a diagram depicting the reduction of noise by the lining of FIG. 4, as a function of frequency.

The performance of the lining in accordance with the invention is shown in FIG. 7 in which noise reduction is plotted against frequency. The curve in dashed line is the performance curve of the lining of FIG. 1, i.e., the curve of FIG. 2 is superimposed on the diagram of FIG. 7. As may be seen from the drawing, noise reflection is considerably reduced in the range of from about 200 Hz to about 1 kHz, as compared with the reduction in a similar range obtained with the prior art lining. In the range above 1 kHz, however, noise reflection is greater in the lining incorporating the extinction layer 22 than it is in conventional linings. In this range noise reduction is, however, sufficiently high anyway so that the relatively lower reduction by the lining in accordance with the invention is of no adverse consequence. It is important to note that within the critical range between about 250 Hz and about 650 Hz which substantially represents the spectrum in which noise emitted by five and six cylinder engines is most noticeable, noise reduction is significantly improved when compared with that attained with conventional linings.

As has been mentioned above, the cover layer 20 of the lining in accordance with the invention may in a prefered embodiment be constituted by the base layer or backing of the kind of carpet in common use for lining the interior of automobiles. The specific mass of the backing is about 0.8 kg/m$^2$ which renders it very suitable as a cover layer. The extinction layer 22 has a specific mass in the prefered range of about 3 kg/m$^2$.

Figure 8:
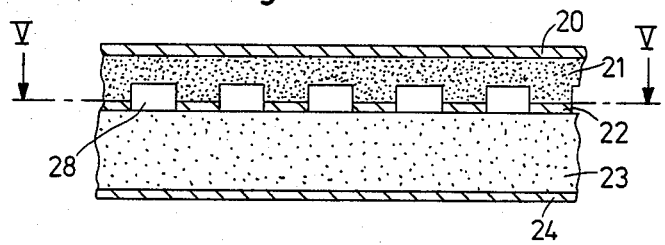
FIG. 8 is a cross-sectional view of an alternate embodiment of a noise reduction lining in accordance with the invention.

It is not necessary that the absorption layer 21 provided between the extinction layer 22 and the cover layer 20 be of uniform thickness throughout. In fact, it may be advantageous in certain circumstances to extend the perforations 28 of the extinction layer 22 into the absorption layer 21 by removing material therefrom in the manner shown in the FIG. 8. In this manner adjusting the elasticity of the absorption layer 21 is simplified as the requirements in respect of its porosity are then less stringent. Moreover, removal of the material results in reduced weight. The increased cost of such an embodiment would be offset by its superior performance.

It will thus be seen that the invention efficiently attains the objects set forth above, among those made apparent from the preceding prescription. Certain changes may be made in carrying out the invention without departing from its scope.

No representatives have been made in respect of materials useful in practicing the invention as such materials are deemed to be state of the art materials wellknown to persons skilled in the art. For instance, the cover layer 20 may be made of felt or fleece, but preferably it is the backing of a carpet. The extinction layer 22 may be made of perforated sheet metal, perforated high density rubber, or bitumous materials. The absorption layers 21 and 23 may comprise cotton padding, of foam materials of polyethylene or polyurethane. Also, a compound traded (in West Germany) under the registered trademark Arocel has been shown to be useful.

It is to be understood, however, that the scope of the invention here described is to be interpreted by the appended claims only. No limitation is intended by statements made in the description which are presented as illustrative only.

The invention having thus been described, what is claimed as new and protected by Letters Patent is:

1. Noise reduction lining, comprising: a base layer for supporting the lining, a cover layer extending in substantially parallel relationship to the base layer, and an absorption layer interposed between the base layer and the cover layer for absorbing noise impinging upon the base layer, wherein there is embedded within the absorption layer an extinction layer having at least one major surface extending in substantially parallel relationship to the cover layer and being provided with perforations, the absorption layer being such that its stiffness is different at another surface of the extinction layer than at the major surface of the extinction layer.

2. The noise reduction lining of claim 1, wherein the absorption layer at the major surface of the extinction layer has a thickness less than the thickness at the other surface of the extinction layer.

3. The noise reduction lining of claim 1, wherein the absorption layer between the extinction layer and the cover layer comprises a material which is open-pored and relatively stiff, and that the absorption layer between the extinction layer and the base layer comprises material which is open-pored and relatively soft.

4. The noise reduction lining of claim 2, wherein the absorption layer between the extinction layer and the cover layer is relatively thin and comprises material which is open-pored and relatively stiff, and that the absorption layer at the other side of the extinction layer is relatively thick and comprises material which is open-pored and relatively soft.

5. The noise reduction lining of claim 4, wherein the cover layer comprises the backing of a carpet.

6. The noise reduction lining of claim 4, wherein the absorption layer between the extinction layer and the cover layer is provided with recesses substantially in the area of the perforations of the extinction layer.

* * * * *